United States Patent
Shyy et al.

(10) Patent No.: US 7,975,036 B2
(45) Date of Patent: Jul. 5, 2011

(54) ADAPTIVE CROSS-LAYER CROSS-NODE OPTIMIZATION

(75) Inventors: Dong-Jye Shyy, McLean, VA (US);
Dawn Szelc, Potomac Falls, VA (US);
James Dunyak, Lexington, MA (US)

(73) Assignee: The MITRE Corporation, McLean, VA (US)

( * ) Notice: Subject to any disclaimer, the term of this patent is extended or adjusted under 35 U.S.C. 154(b) by 427 days.

(21) Appl. No.: 11/431,653

(22) Filed: May 11, 2006

(65) Prior Publication Data
US 2007/0266134 A1 Nov. 15, 2007

(51) Int. Cl.
*G06F 15/16* (2006.01)
*G06F 15/173* (2006.01)

(52) U.S. Cl. .......... 709/223; 709/230; 709/224

(58) Field of Classification Search ............ 709/223, 709/224, 230
See application file for complete search history.

(56) References Cited

U.S. PATENT DOCUMENTS

| | | | | |
|---|---|---|---|---|
| 5,806,075 A * | 9/1998 | Jain et al. | ........... | 707/201 |
| 5,815,710 A * | 9/1998 | Martin et al. | ........... | 719/316 |
| 6,571,388 B1 * | 5/2003 | Venkatraman et al. | ........ | 717/166 |
| 6,631,140 B1 * | 10/2003 | Sjodin | ........... | 370/469 |
| 6,715,100 B1 * | 3/2004 | Hwang | ........... | 714/5 |
| 7,295,119 B2 * | 11/2007 | Rappaport et al. | ........ | 340/572.4 |
| 7,305,092 B2 * | 12/2007 | Mauro et al. | ........... | 380/270 |
| 7,463,892 B2 * | 12/2008 | Eiger et al. | ........... | 455/452.2 |
| 7,480,312 B2 * | 1/2009 | Ossman | ........... | 370/469 |
| 7,526,577 B2 * | 4/2009 | Pinkerton et al. | ........... | 709/249 |
| 7,533,141 B2 * | 5/2009 | Nadgir et al. | ........... | 709/200 |
| 7,584,260 B2 * | 9/2009 | Craft et al. | ........... | 709/212 |
| 7,586,876 B2 * | 9/2009 | Chung et al. | ........... | 370/331 |
| 7,627,001 B2 * | 12/2009 | Craft et al. | ........... | 370/469 |
| 7,636,372 B2 * | 12/2009 | Fan et al. | ........... | 370/463 |
| 2004/0098447 A1 * | 5/2004 | Verbeke et al. | ........... | 709/201 |
| 2005/0201340 A1 * | 9/2005 | Wang et al. | ........... | 370/337 |
| 2006/0114928 A1 * | 6/2006 | Utsunomiya et al. | ........ | 370/448 |
| 2006/0215596 A1 * | 9/2006 | Krishnaswamy et al. | .... | 370/328 |
| 2006/0262718 A1 * | 11/2006 | Li et al. | ........... | 370/229 |
| 2007/0058664 A1 * | 3/2007 | Kim et al. | ........... | 370/447 |
| 2007/0070902 A1 * | 3/2007 | Elaoud et al. | ........... | 370/231 |
| 2007/0140245 A1 * | 6/2007 | Anjum et al. | ........... | 370/390 |
| 2007/0206547 A1 * | 9/2007 | Gong et al. | ........... | 370/338 |
| 2007/0206552 A1 * | 9/2007 | Yaqub et al. | ........... | 370/338 |
| 2008/0095124 A1 * | 4/2008 | Ramos et al. | ........... | 370/336 |

* cited by examiner

Primary Examiner — Kristie D Shingles
(74) Attorney, Agent, or Firm — Sterne Kessler Goldstein & Fox, P.L.L.C.

(57) ABSTRACT

Methods and systems for adaptive cross-layer cross-node optimization in wireless communication systems are provided. Adaptive cross-layer cross-node optimization allows for conventional cross-layer optimization coupled with the ability to adaptively optimize cross-layer interactions across node boundaries. In one aspect, adaptive cross-layer cross-node optimization includes adaptively and dynamically shifting functions/layers among nodes in a network, so that a global network objective is achieved. In another aspect, adaptive cross-layer cross-node optimization includes adaptively and dynamically distributing functions/layers across a network, according to changes and/or events in the network. In a further aspect, adaptive cross-layer cross-node optimization includes dynamically defining or changing individual node functions within a network, so that a global network functionality may emerge.

37 Claims, 8 Drawing Sheets

BSC: Base Station Controller
MS: Mobile Station

ADAPTIVE CROSS-LAYER CROSS-NODE OPTIMIZATION

FIELD OF THE INVENTION

The present invention relates generally to wireless communication systems. More particularly, the invention relates to adaptive cross-layer cross-node optimization in wireless communication networks.

BACKGROUND OF THE INVENTION

Conventional wireless communication designs are based on the OSI (Open Systems Interconnection) model of 7 layers interacting with each other.

Recent trends of cross-layer optimization intend to blur the boundaries between layers with the end result being a joint optimization that can be performed on multiple layers simultaneously. This has been the focus of major research efforts recently with the Cognitive Radio and the DARPA UNMAN (Universal Adaptive Controller for Mission Aware Networks) projects, for example.

However, recent cross-layer optimization research efforts remain confined within a single node or device. Cross-layer optimization occurs within a single node and may only adapt to changes within that same node. As a result, cross-layer optimization may not react to changes in network conditions and/or to network events as in the case of mission aware networks.

What is needed therefore are methods and systems to enable cross-layer cross-node optimization in wireless communication systems. This cross-layer cross-node optimization allows for an adaptive distribution over time of functions/layers across a wireless network, according to changes and/or events in the network as well as to satisfy certain network objectives.

BRIEF SUMMARY OF THE INVENTION

Methods and systems for adaptive cross-layer cross-node optimization in wireless communication systems are provided. Adaptive cross-layer cross-node optimization allows for conventional cross-layer optimization coupled with the ability to adaptively optimize cross-layer interactions across node boundaries.

In one aspect, adaptive cross-layer cross-node optimization includes adaptively and dynamically shifting functions/layers among nodes in a network, so that a global network objective is achieved.

In another aspect, adaptive cross-layer cross-node optimization includes adaptively and dynamically distributing functions/layers across a wireless network, according to changes and/or events in the network.

In a further aspect, adaptive cross-layer cross-node optimization includes dynamically defining or changing individual node functions within a network, so that a global network functionality may emerge.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

1. Introduction

Conventional wireless communication designs are based on the OSI (Open Systems Interconnection) model of 7 layers interacting with each other. Each layer has the property that it uses only the functions of the layer below, and exports functionality only to the layer above. A system that implements protocol behavior consisting of a series of these layers is known as a 'protocol stack'. Protocol stacks can be implemented either in hardware or software, or a mixture of both. Typically, only the lower layers are implemented in hardware, with the higher layers being implemented in software.

Recent trends of cross-layer optimization intend to blur the boundaries between layers with the end result being a joint optimization that can be performed on multiple layers simultaneously. This has been the focus of major research efforts recently with the Cognitive Radio and the DARPA UNMAN (Universal Adaptive Controller for Mission Aware Networks) projects, for example. Accordingly, multiple layers within the OSI model are jointly optimized with respect to a set of objectives, which may vary according to network and/or application type.

Figure 1:
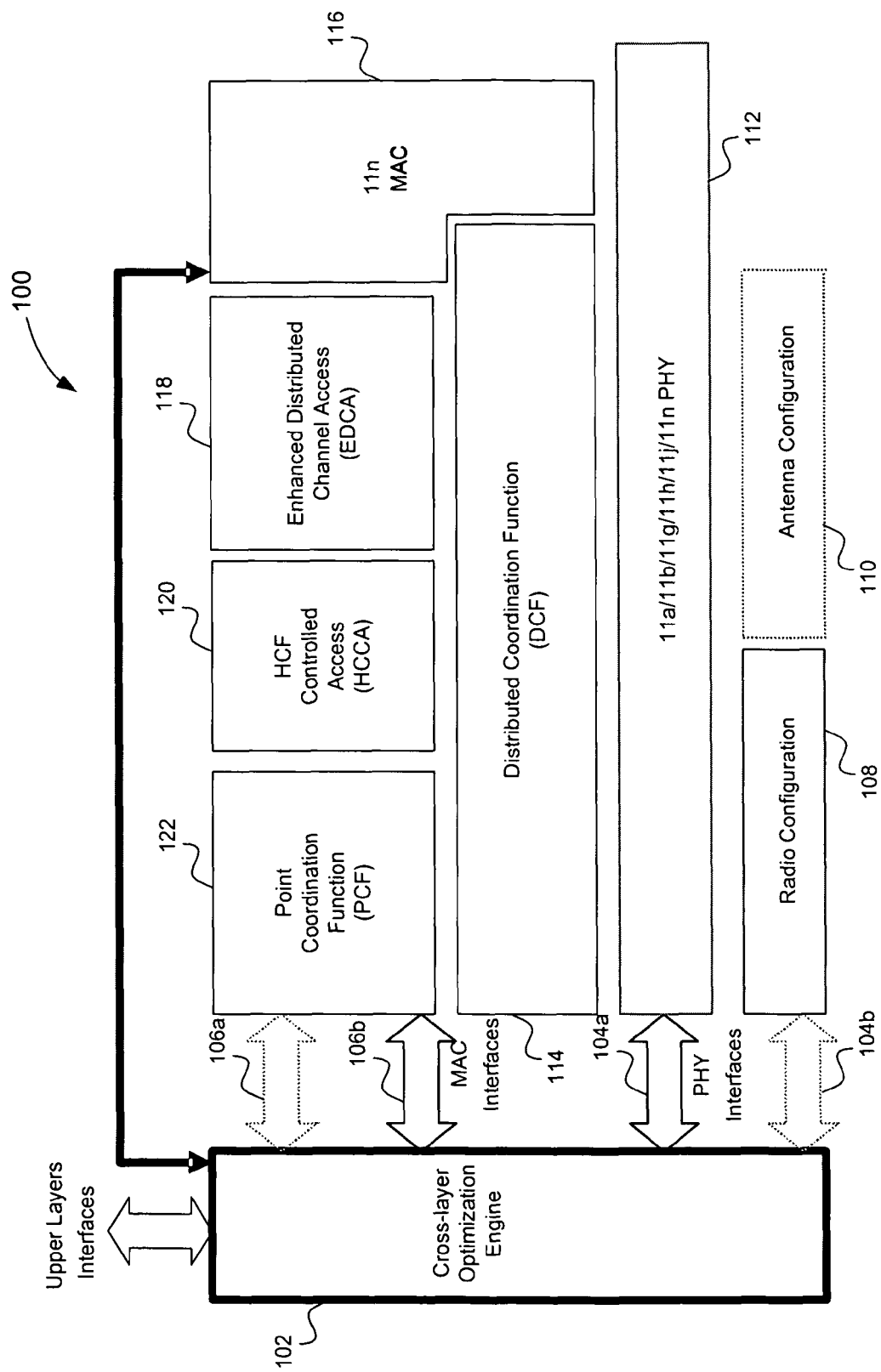
FIG. 1 illustrates an architecture for cross-layer optimization in a wireless device using the IEEE 802.11 standard.

FIG. 1 illustrates an architecture 100 for cross-layer optimization in a wireless device using the IEEE 802.11 standard. For convenience, a simplified Medium Access Control (MAC) sublayer and physical (PHY) layer are illustrated in FIG. 1. Upper layers of the OSI model are not shown in FIG. 1.

The MAC sublayer includes a MAC module 116, a Distributed Coordination Function (DCF) module 114, a Point Coordination Function (PCF) module 122, a Hybrid Coordination Function (HCF) Controlled Access (HCCA) module 120, and an Enhanced Distributed Channel Access (EDCA) module 118. The PHY layer includes a PHY module 112, a radio configuration module 108, and an antenna configuration module 110. Function and operation of these modules is defined in the IEEE 802.11 standards and will not be described herein.

A cross-layer optimization engine 102 communicates with the different layers of the OSI protocol stack of the wireless device. For example, cross-layer optimization engine 102 communicates using MAC interfaces 106a and 106b with the MAC sublayer modules and using PHY interfaces 104a and 104b with the PHY layer modules. Similarly, cross-layer optimization engine 102 communicates with upper layers of the OSI stack using upper layer interfaces, as shown in FIG. 1.

Accordingly, cross-layer optimization engine 102 may simultaneously communicate with different layers of the OSI stack. Further, cross-layer optimization engine 102 may simultaneously affect behavioral change within each of the different layers, by making parametric changes in each layer.

Cross-layer optimization is concerned with optimizing the performance of the protocol stack with respect to a set of objectives. This set of objectives may be user/application defined or network defined. In other words, cross-layer optimization involves finding optimal points of operation within each layer of the protocol stack, such that the stack performance is optimized with respect to a set of objectives. Referring back to FIG. 1, this function is performed by cross-layer optimization engine 102 in architecture 100.

However, cross-layer optimization remains confined within a single node or device. In other words, cross-layer optimization is only concerned with optimizing a single node's performance with respect to a set of objectives. As a result, cross-layer optimization may not react to changes in network conditions and/or to network events. Further, cross-layer optimization does not allow for optimization across node boundaries in order to globally optimize performance in the network.

2. Adaptive Cross-Layer Cross-Node Optimization

Adaptive cross-layer cross-node optimization, according to the present invention, allows for conventional cross-layer optimization, as described above, coupled with the ability to adaptively optimize cross-layer interactions across node boundaries. This can be described as viewing a network having a plurality of nodes as a single system, wherein inter-node interaction (interaction among subsystems) is optimized in order to optimize global network performance. In one aspect, this includes adaptively and dynamically shifting functions/layers among nodes in the network, so that a global network objective is achieved. In another aspect, this includes dynamically defining or changing individual node functions, so that a global system functionality may emerge.

2.1 Method for Adaptive Cross-Layer Cross-Node Optimization

Figure 9:
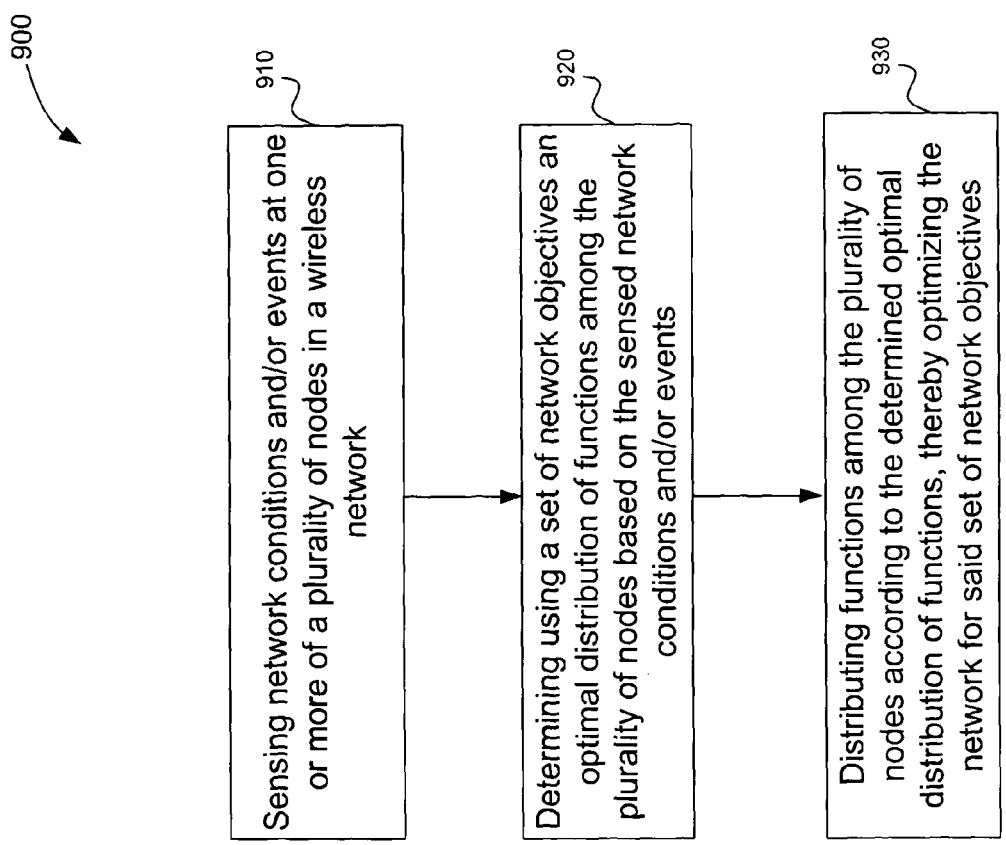
FIG. 9 is a process flowchart that illustrates a method for cross-layer cross-node optimization according to one aspect of the present invention.

FIG. 9 is a process flowchart 900 that illustrates a method for adaptive cross-layer cross-node optimization in a wireless network, according to one aspect of the present invention.

Process flowchart 900 begins in step 910, which includes sensing network conditions and/or events at one or more of a plurality of nodes of the network. In an embodiment, network conditions include one or more of network traffic conditions, network load conditions, network connectivity conditions, network interference conditions, and network capacity conditions. Network events include one or more of network attacks, mission defining events, and node failure/addition events. In an embodiment, sensing is performed using intelligent engines at the one or more of the plurality of nodes. For example, an intelligent engine may be capable of environment sensing as well as status/metrics data collection through interaction with the different stack layers of the node. Further, the intelligent engine may have means for analyzing the collected data to infer information about node and/or network conditions. In another aspect, network events may be delivered to the intelligent engine in the form of update messages from a central command node or other nodes in the network. In another embodiment, the intelligent engines further perform cross-layer optimization, as described above, within their respective nodes, according to a set of node objectives associated with each of the plurality of nodes.

Step 920 includes determining using a set of network objectives an optimal distribution of functions among the plurality of nodes based on the sensed network conditions and/or events. In an embodiment, step 920 includes communicating sensed network conditions and/or events between the one or more of the plurality of nodes, and performing a joint optimization of functions based on the sensed conditions and/or events, using the set of network objectives. The set of network objectives may include any kind of objectives desired by a user (designer) of the network. For example, network objectives may be based on network security considerations, performance considerations, and/or mission constraints. Further, network objectives may be dynamically varied according to network conditions and/or events. For example, under normal operating conditions, a network may be optimized for minimizing energy consumption using a first distribution of node functions, but may adopt a second distribution of node functions to increase security, when a network attack is detected.

In one aspect of the present invention, determining an optimal distribution of functions is distributedly performed by the one or more of the plurality nodes in the network. This is done, for example, by the intelligent engines at the one or more of the plurality of nodes communicating with each other such that a joint optimization is achieved for the whole system. In an embodiment, the intelligent engines operate according to utility (cost) functions or requirements that ensure that joint optimization is achieved. Other rules may also be enabled for nodes to follow when tradeoffs exist between cross-layer (achieving node objectives) and cross-node optimization (achieving network objectives).

In another aspect of the present invention, which is applicable for centralized and hierarchical networks, determining an optimal distribution of functions is centrally performed by a central node in the network. In an embodiment, intelligent engines at one or more of the plurality of nodes communicate sensed network conditions and/or events to the central node. The central node performs a global network optimization based on the received information, according to network objectives, to determine an optimal distribution of functions among the plurality of nodes. The central node then communicates information to the plurality of nodes to adapt into the determined distribution.

Referring back to process flowchart 900, step 930 includes distributing functions among the plurality of nodes according to the determined optimal distribution of functions, thereby optimizing the network for the set of network objectives. In an embodiment, distributing functions includes shifting protocol stack layers among nodes in the network. For example, the MAC sublayer of the protocol stack may be shifted from an access controller (AC) to an access point (AP) and vice versa, in a WLAN network. In another embodiment, distributing functions includes changing and/or defining new functions within one or more nodes in the network, thereby introducing new functionality in the network. In this embodiment, distributing functions involves more than just shifting existing functions among nodes to include dynamically implementing new functionality to satisfy network objectives. For example, in a cellular network, distributing functions may include distributing base station functionality to a mobile station (MS) to ease a hot spot condition or when the base station is under attack.

In one aspect of the present invention, distributing functions is performed by enabling certain functions at certain nodes in the network, while simultaneously disabling these same functions at other nodes in the network. Referring back to the AC/AP example, shifting the MAC sublayer may be achieved by enabling the MAC functionality at the AP while disabling it at the AC. In this aspect, the functions being distributed may already be implemented, in hardware or software, at either end of nodes involved in the distribution of functions. Accordingly, in this aspect, distributing functions is achieved simply by asserting where certain functions are to be performed, without the need to dynamically implement these functions at nodes in the network. This, however, is another aspect of the present invention, wherein distributing functions includes performing over-the-air software download of functions to nodes in the network, according to the optimal distribution of functions. In an embodiment, the nodes include configurable platform devices, which allow for the dynamic implementation of functions at these nodes. For example, the nodes may include SDR (Software Defined Radio), FPGA (Field Programmable Gated Array), and/or TP (Tiled Processor) platforms.

It was noted above that process flowchart 900 represents an adaptive method for cross-layer cross-node optimization. Further, this method may provide dynamic cross-layer cross-node optimization by repeatedly performing steps (a)-(c) over the lifetime of the network. This may be done reactively (e.g., in response to changes/events in the network) or proactively (e.g., at periodic intervals).

2.2 Exemplary Embodiments

Exemplary embodiments according to the present invention will now be provided in the context of IEEE 802.11 WLANs, cellular networks, JTRS networks, and MIMO systems. The present invention is not limited to these exemplary embodiments. As can be appreciated by a person skilled in the relevant art based on the teachings herein, embodiments according to the present invention may also be envisioned, among others, in IEEE 802.15 WPANs, IEEE 802.16 WMANs, mobile ad hoc networks (MANETs), and wireless sensor networks.

2.2.1 Adaptive "Thick"-"Thin" Access Point Architecture in WLANs

The IEEE 802.11 standard, developed in the late 90s, defined MAC and PHY layer standards for wireless LANs. In an 802.11 WLAN, each node in the network is either a station (STA) or/and an access point (AP). By definition, an AP may also include a STA. A WLAN architecture is based on STAs associating themselves with an AP to join the network (distribution system). APs administer Point Coordination Function (PCF) to control access of associated STAs to the network, time synchronization (e.g., beaconing) functions, and power management support.

In current WLAN implementation, called "thick" AP, an AP implements all the functionality of all layers defined by the IEEE 802.11 standard. This includes, for example, MAC, authentication, encryption, mobility management, load balancing, and IP tunneling/routing. For several reasons, however, including cost, scalability, and suitability for functions requiring global view of the network (e.g., resource management, security management), the "thick" AP architecture is less than optimal.

A recently proposed architecture, "thin" AP, envisions using an Access Controller (AC) to reduce the amount of processing done (and cost) in APs by moving functions suitable for centralization to a centralized controller. These functions typically require global network view and their performance may be optimized with a "thin" AP architecture. Further, this architecture provides for easy configuration, maintenance, and management of APs.

Figure 2:
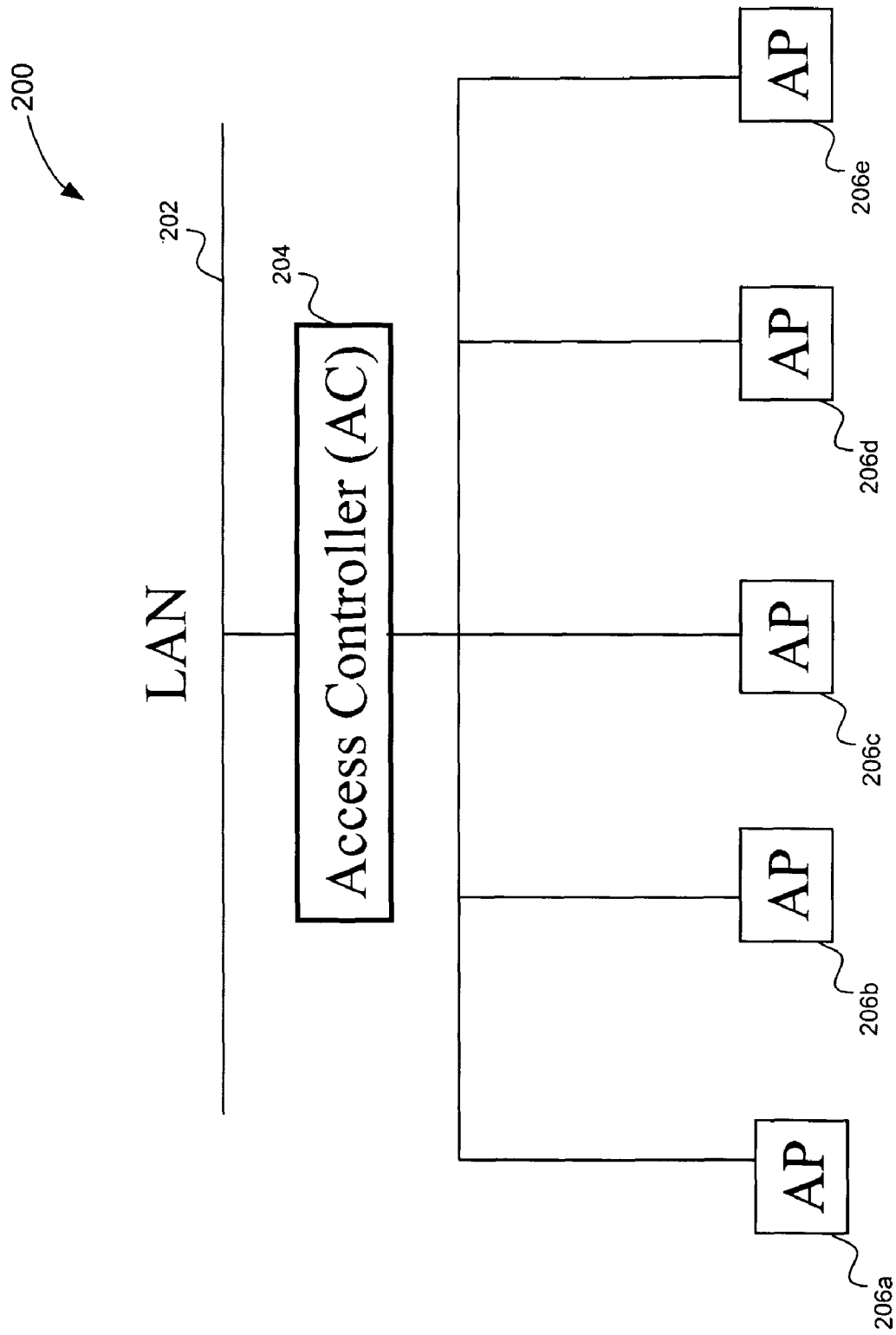
FIG. 2 illustrates a WLAN access point architecture.

Accordingly, "thin" AP requires the use of a centralized access controller, which connects to each of the APs in the network and controls access to the LAN or distribution system. FIG. 2 illustrates a "thin" AP wireless LAN architecture 200. As illustrated, access points (AP) 206a-206e communicate directly with an access controller (AC) 204. Communication between AC and AP is done wirelessly. In turn, AC 204 connects APs 206a-206e to LAN 202.

Figure 3:
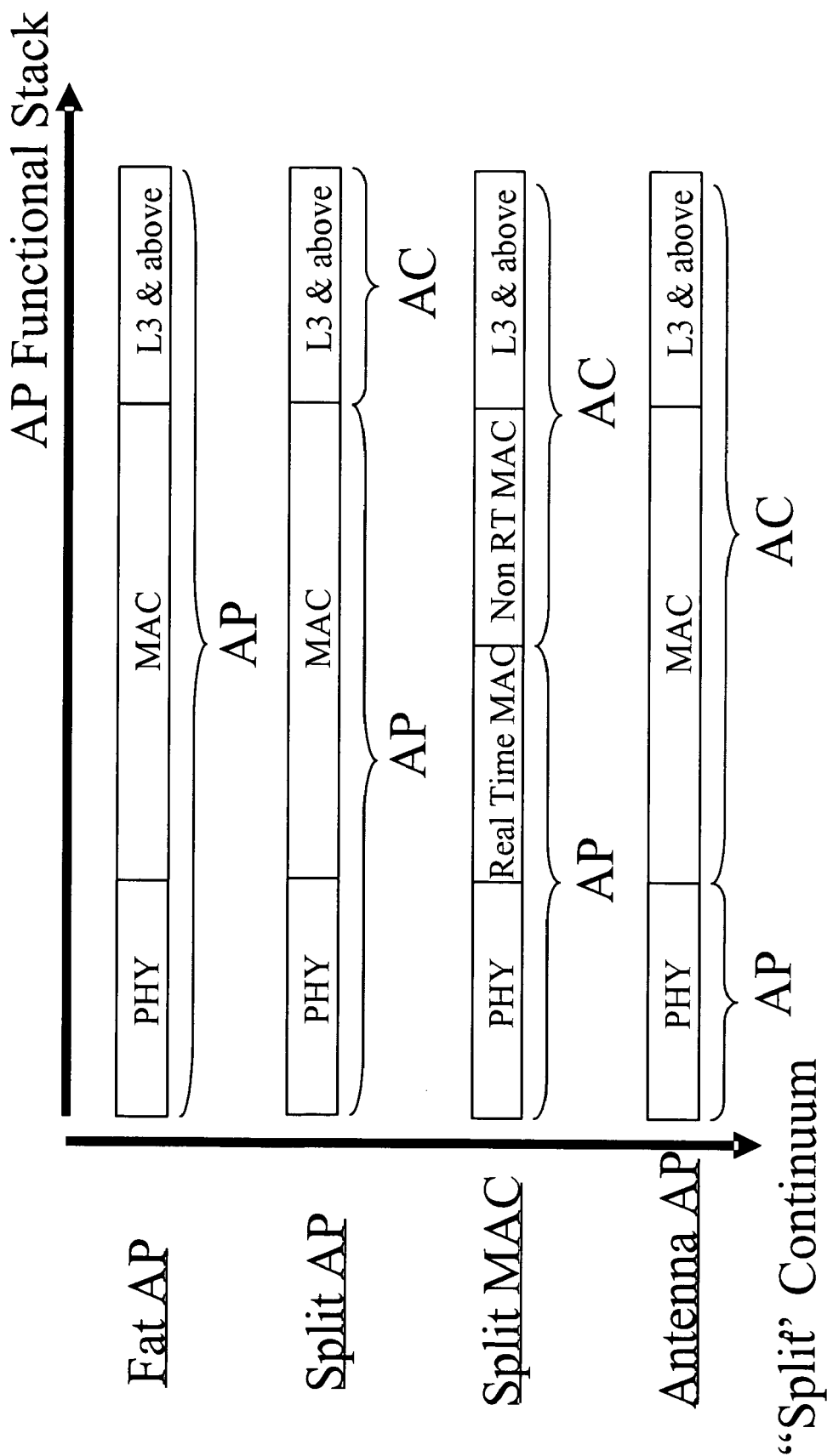
FIG. 3 illustrates IEEE 802.11 split architecture examples.
Figure 4:
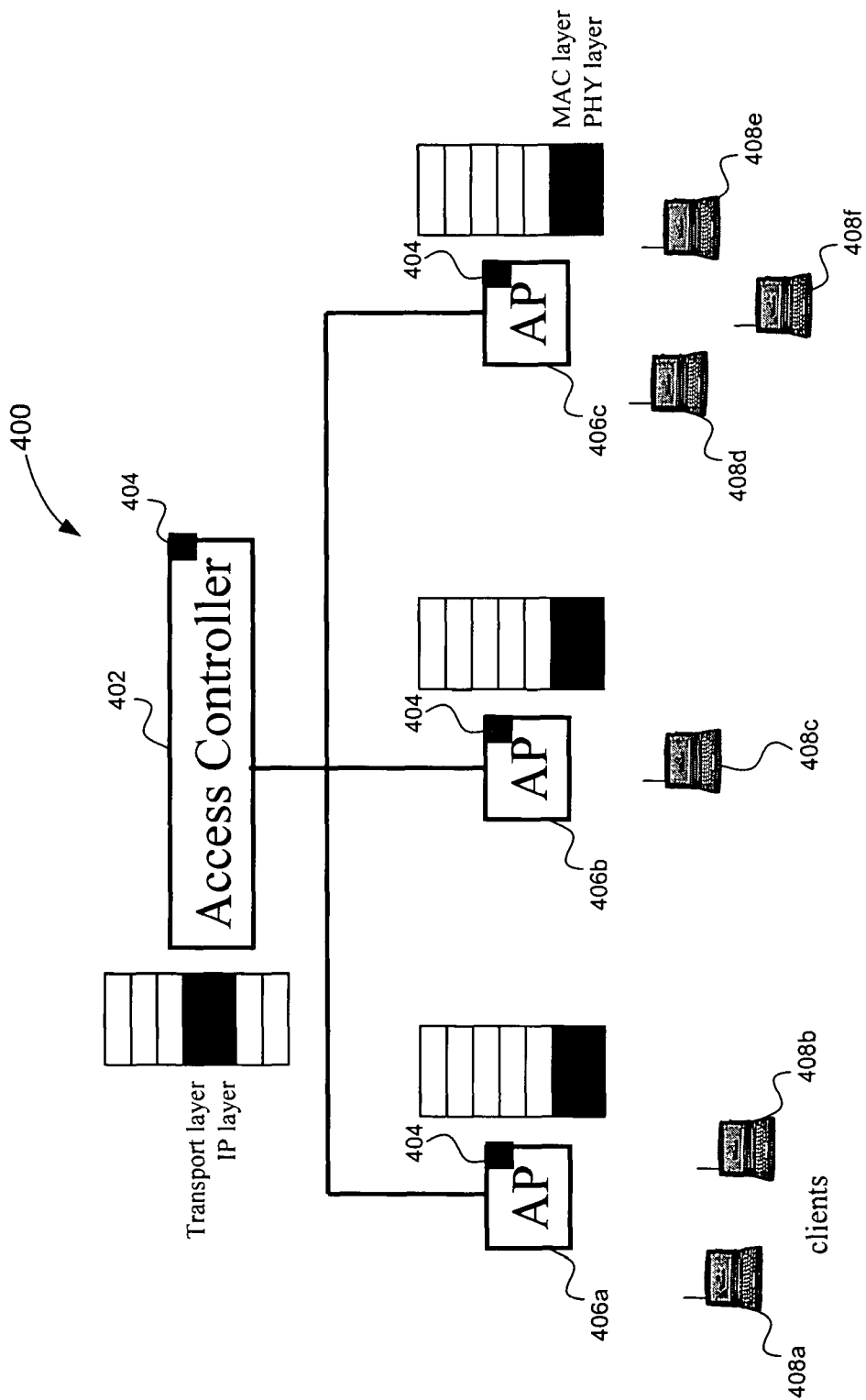
FIG. 4 illustrates a WLAN employing a "split" AP architecture.

The split of functions between AC and AP remains the topic of much research in the WLAN industry, with a general understanding that functions requiring global network view and unified policy (layer 3 and above in the protocol stack) are good candidates to be resident in the centralized AC, and that time-critical functions are good candidates to be resident in the AP. FIG. 3 illustrates examples of various architectures with respect to a split continuum between AP and AC. As shown in FIG. 3, protocol stack functionality may be divided between AP and AC in various ways to result in different AP architectures such as a "Fat" AP, a "Split" AP, a "Split MAC" AP, or an "Antenna" AP, for example. FIG. 4 illustrates a WLAN 400 having a "Split" AP architecture according to FIG. 3. FIG. 4 will be further discussed below.

According to one aspect of the present invention, the optimal split of functions between AP and AC can be formulated as an adaptive cross-layer cross-node optimization problem. In an embodiment, a cost function is used to incorporate a set of network objectives. For example, the cost function may incorporate one or more factors such as, for example, RF and MAC performance (channel selection, interference mitigation), resource management (load balancing), security management, and/or mobility management (handover). Subsequently, the split of functions between AP and AC that corresponds to minimizing this cost function represents the optimal split of functions between AP and AC with respect to the incorporated network objectives.

This AP/AC cross-layer cross-node optimization may be performed statically or dynamically. In a static approach, an offline analysis is performed to determine the optimal split of functions between AP and AC, based on which functions are distributed to nodes in the network. This approach, however, does not support re-distribution of functions responsive to changes and/or events in the network. The dynamic approach, on the other hand, allows for a real-time re-distribution of functions between AP and AC according to network conditions, network events, and/or changes in network objectives. In an embodiment, this real-time re-distribution is performed using over-the-air software download of functions to nodes in the network. An example of dynamic re-distribution of functions between AP and AC, according to the present invention, will now be provided with reference to FIG. 4.

FIG. 4 illustrates a WLAN 400, which includes an Access Controller (AC) 402, a plurality of Access Points (APs) 406a-406c, and a plurality of clients 408a-408f. Each of clients 408a-408f associates itself with one of APs 406a-406c, as shown. APs 406a-406c are connected to AC 402, which controls the access to a LAN or distribution system (not shown in FIG. 4). In an embodiment of the present invention, each node in WLAN 400 includes an intelligent engine 404. Intelligent engines 404 may communicate with each other, as described above, and may jointly perform cross-layer cross-node optimization according to a set of network objectives. the illustration of FIG. 4, WLAN 400 operates according to a "Split" AP architecture, as defined in FIG. 3. This includes having the PHY and MAC layer functionality performed at the AP, while upper layer (L3 and above, e.g., Transport and IP) functionality is performed at the AC. However, according to the present invention, dynamic re-distribution of functions allows for the WLAN to adapt its AP architecture according to network conditions, network events, and/or changes in network objectives. In an example, if an attack at the MAC layer level is detected in the network, an optimal re-distribution of functions may include shifting the MAC layer functionality to the AC, such that unified and sophisticated security measured can be implemented, resulting in an "Antenna" AP architecture.

Other embodiments according to the present invention are also possible in the context of WLAN networks, as can be understood by a person skilled in the relevant art based on the teachings herein. These embodiments are not limited to shifting functionality between AP and AC, and may further include distributing functionality to clients of the WLAN, such as asking a client to become an AP or vice versa.

2.2.2 JTRS Wireless Network Decomposition

Considered a pivotal Department of Defense (DoD) transformational program, the Joint Tactical Radio System (JTRS) is a Defense Department-wide initiative to develop a family of software-programmable tactical radios that will provide a warfighter with voice, data and video communications, as well as interoperability across the joint battlespace.

In JTRS usage, the term waveform is used to describe the entire set of radio functions that occur from the user input to the RF output and vice versa. JTRS will provide a wideband networking capability, called Wideband Networking Waveform (WNW), to provide high-speed voice and data communications.

Figure 5:
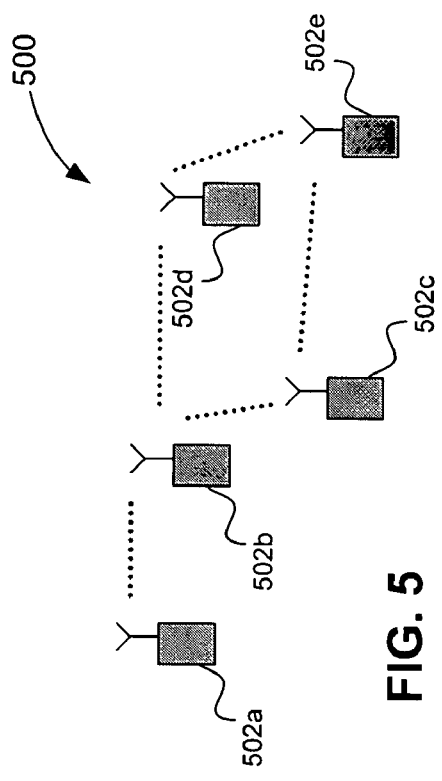
FIG. 5 illustrates a conventional JTRS (Joint Tactical Radio System) network architecture

FIG. 5 illustrates a conventional JTRS (WNW) network architecture 500, which includes a plurality of JTRS nodes 502a-502e. In this conventional architecture, each JTRS node performs as an IP router, forwarding traffic for other nodes in the network. This, however, necessitates that each JTRS node 502a-502e includes higher layer functionality, such as a routing layer, for example, resulting in a higher cost, larger battery, larger size, and more weight system.

Figure 6:
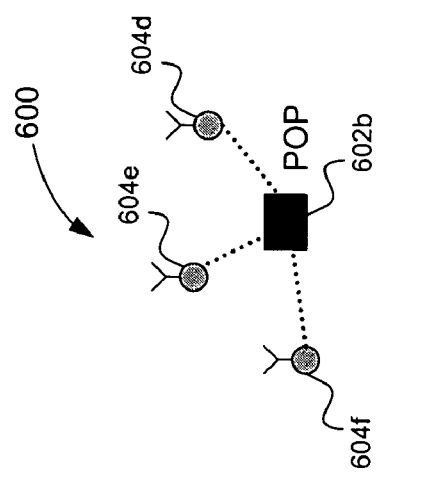
FIG. 6 illustrates an alternate JTRS network architecture.

An alternate JTRS (WNW) architecture 600 is illustrated in FIG. 6. In this alternate architecture, Point of Presence (POP) nodes 602a and 602b are deployed in the network. In an embodiment, higher layer functionality such as routing, for example, are placed on the POP nodes 602a and 602b, while only waveform (Physical layer) and MAC layer functions are placed on JTRS nodes 604a-604e. Each JTRS node is one hop away from a POP node. POP nodes 602a and 602b are linked together using SATCOM links, for example.

Adaptive cross-layer cross-node optimization, according to the present invention, can be applied to the alternate JTRS (WNW) architecture 600 of FIG. 6. As understood by a person skilled in the relevant art based on the teachings herein, several scenarios exist for shifting functionality between POP and JTRS nodes based on network conditions and/or events. In an example embodiment, during enemy attack, POP nodes 602a and 602b distribute all essential functions/layers to their associated JTRS nodes 604a-604e to increase network survivability.

Similar to what have been described above with reference to WLANs, determining the optimal split of functions between POP and JTRS nodes may be performed either distributedly or centrally. Further, methods for performing optimization using cost functions that incorporate network objectives may also be used.

2.2.3 Embodiments in Cellular Networks

Figure 7:
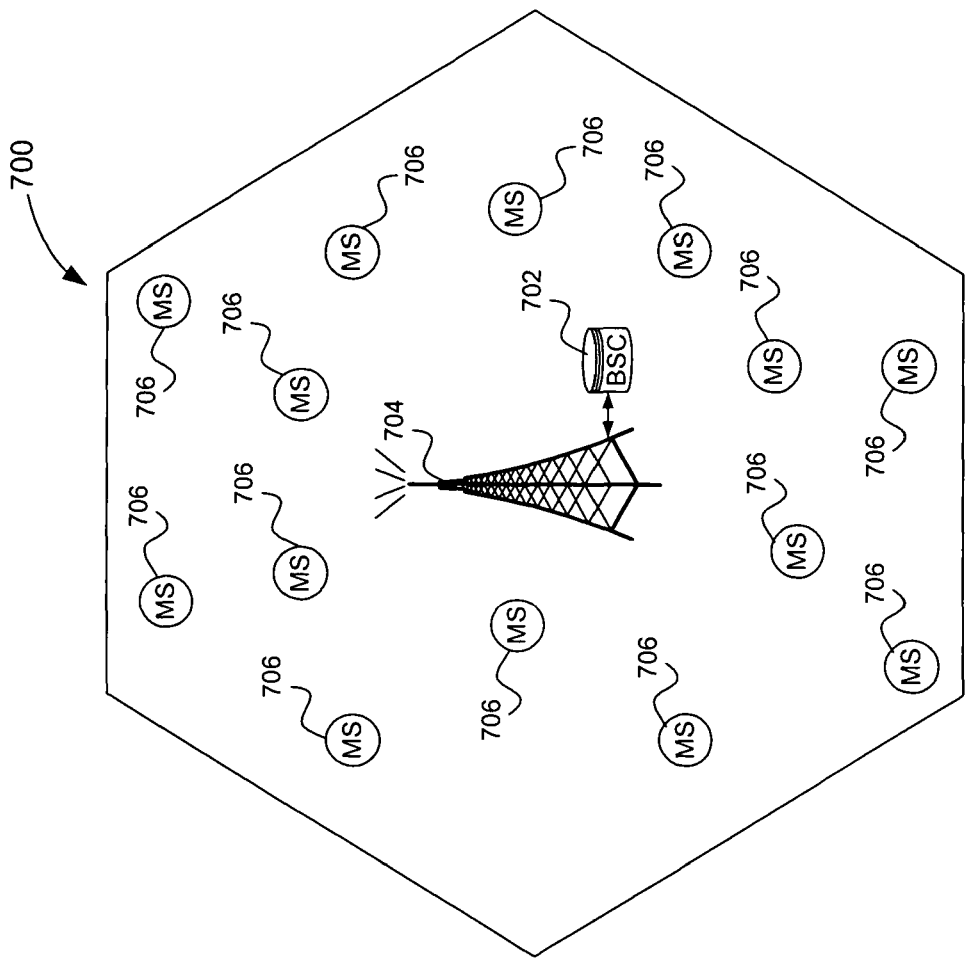
FIG. 7 illustrates a conventional cellular network architecture.

FIG. 7 illustrates a conventional cellular network architecture. A cell 700 includes a base station (BS) 704, a base station controller (BSC) 702, and a plurality of mobile stations (MS) 706. The BSC 702 controls the base station 704 in order to provide network access to the mobile stations 706.

Typically, many essential functions such as RF management, mobility management, and power control are performed by the base station.

According to the present invention, cross-layer cross-node optimization can be performed in cellular networks in order to optimally divide functions between BS 704 and MS 706. This optimal distribution of functions may, as described above, be determined according to network objectives, network conditions, and/or network events.

In an embodiment, when a BS is under attack, the BS passes essential functions/layers to one or more mobile stations in the network, which can assume the role of a BS if necessary.

In another embodiment, a BS may distribute functions to one or more mobile stations in the network, such that the cell is split into multiple smaller cells with these mobile stations acting as base stations within the smaller cells. This approach may be used to remedy a hotspot situation, for example. The one or more mobile stations may be SDR-enabled mobiles with configurable platforms, but not all mobile stations in the network need to be SDR-enabled in this scenario.

In yet another embodiment, when a BS cannot meet QOS (Quality of Service) requirements of a certain MS (e.g., data rate), the BS may distribute performance enhancing layers (e.g., interference cancellation, antenna array, or MIMO) to the mobile station, such that QOS is met.

Other embodiments according to the present invention are also possible in the context of cellular networks, as can be understood by a person skilled in the relevant art based on the teachings herein. These embodiments are not limited to shifting functionality between BS and MS, and may further include distributing functionality to mobile stations to act as relay nodes.

2.2.4 Synthetic MIMO

Figure 8:
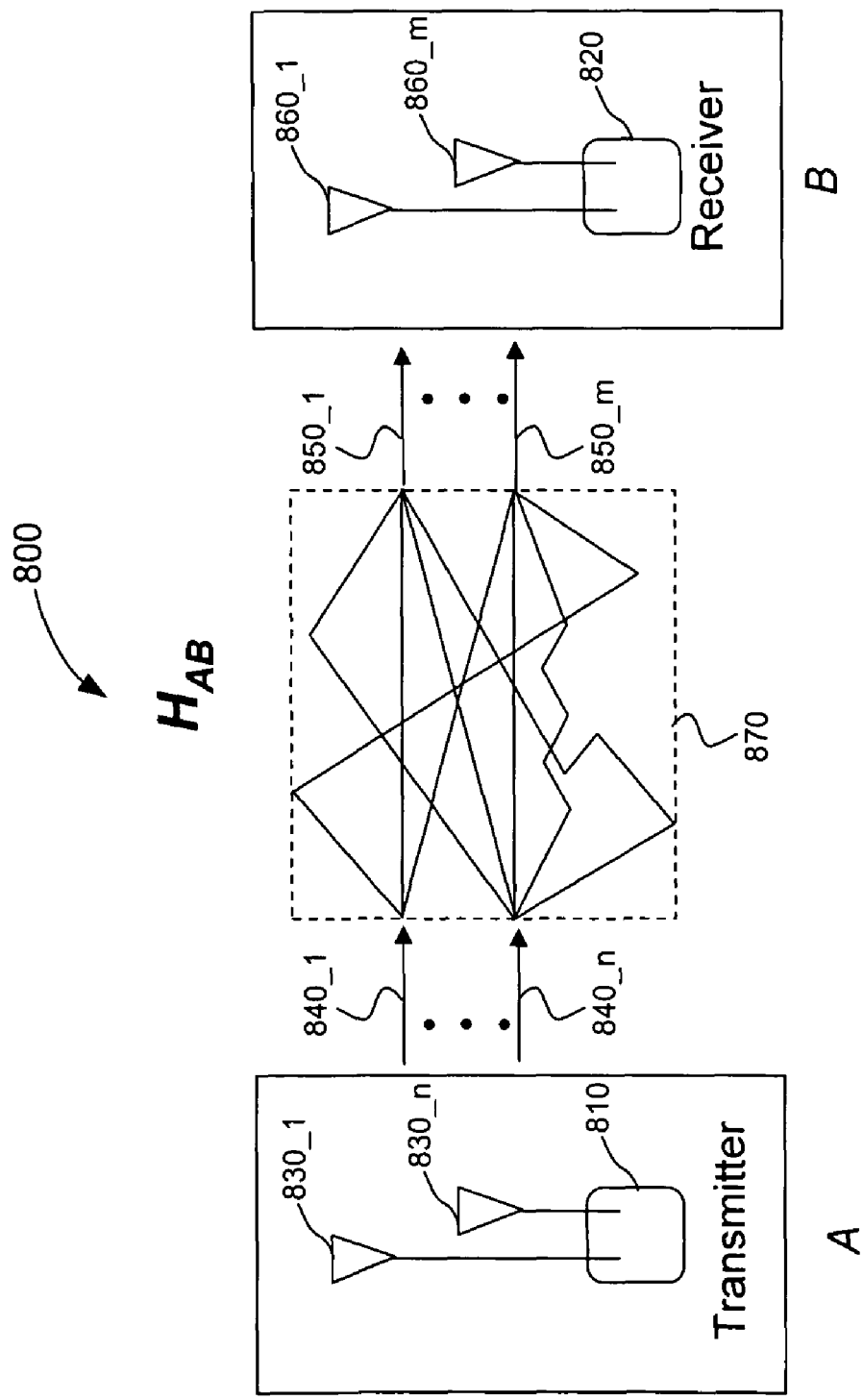
FIG. 8 illustrates a conventional MIMO (Multiple Input Multiple Output) system.

FIG. 8 illustrates a conventional MIMO communication system 800. Communication system 800 includes transceiver systems A and B and a communication channel 870. Transceiver system A includes a transmitter 810. Transceiver system B includes a receiver 820. Transmitter 810 employs multiple transmit antennas 830-$\{1, \ldots, n\}$. Receiver 820 employs multiple receive antennas 860-$\{1, \ldots, m\}$. The number of transmit antennas (n) at transmitter 810 may or may not be equal to the number of receive antennas (m) at receiver 820.

Communication channel 870 represents a MIMO channel. Accordingly, communication channel 870 includes multiple spatial sub-channels formed between the multiple transmit antennas 830-$\{1, \ldots, n\}$ and the multiple receive antennas 860-$\{1, \ldots, m\}$.

In general, spatial sub-channels of a MIMO communication channel experience different channel conditions such as fading and multipath effects, for example. Further, channel conditions of the spatial sub-channels may vary with time. Accordingly, a channel matrix of the channel also varies with time, and is typically only considered to remain constant over a coherence time parameter of the channel.

Still referring to FIG. 8, signals 840-$\{1, \ldots, n\}$ represent transmitted signals by respective transmit antennas 830-$\{1, \ldots, n\}$ of transceiver A. Signals 840-$\{1, \ldots, n\}$ may be transmitted with equal or different transmit power levels. As illustrated in FIG. 8, transmitted signals 840-$\{1, \ldots, n\}$ propagate in different propagation paths from A to B, and thus experience different channel effects. At B, transmitted signals 840-$\{1, \ldots, n\}$ recombine to generate received signals 850-$\{1, \ldots, m\}$ at respective receive antennas 860-$\{1, \ldots, m\}$. Received signals 850-$\{1, \ldots, m\}$ may be received at equal or different power levels. Further, received signals 850-$\{1, \ldots, m\}$ may be received at equal or different instants of time.

MIMO systems provide improved performance compared to single input single output (SISO) systems in the presence of multipath fading which characterize nearly all wireless communication channels. For this reason, MIMO systems are desirable, albeit not always easy to implement, in various wireless communication applications.

According to the present invention, a virtual MIMO system, "Synthetic MIMO", can be created using function distribution techniques as described above, to emulate a MIMO system in different scenarios of wireless networks.

In an embodiment in the context of cellular networks, a base station may determine propagation conditions between itself and a mobile station and then derive optimal MIMO configurations for both itself and the mobile station. The base station would then distribute the derived MIMO configurations to the mobile station, which may recruit a number of adjacent stations to create a MIMO system. Accordingly, a plurality of single antenna mobile stations can have functions distributed to emulate a single multiple antenna node.

In another embodiment, multiple single-antenna devices cooperative with each other to form a virtual cooperative MIMO system. In cooperative MIMO, multiple nodes coordinate their transmissions so that cooperative parallel transmissions can be established between multiple source nodes and a destination node. In cooperative MIMO, some of the functions required at the physical layer are pushed up to the MAC layer. Further these elevated MAC layer functions are distributed to a number of nodes to jointly, cooperatively form a virtual MIMO system. These functions include synchronization among different streams (antennas), selection of antennas and assignment of space time coding.

3.0 Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for cross-layer cross-node enhancement in a wireless communication network having a plurality of nodes, said nodes having one or more processors, the method comprising:
    a) sensing network conditions and/or events at one or more of the plurality of nodes;
    b) determining, using a set of network objectives, an enhanced distribution of wireless communication network protocol layers among the plurality of nodes based on the sensed network conditions and/or events; and
    c) distributing wireless communication network protocol layers among the plurality of nodes according to the determined enhanced distribution of wireless communication network protocol layers, thereby enhancing the network for said set of network objectives;
    wherein distributing wireless communication network protocol layers comprises assigning a respective function to a node of the plurality of nodes, the respective function defining for the node one or more respective wireless communication network tasks for performance by the node.

2. The method of claim 1, wherein said sensing step is performed using one or more intelligent engines at said one or more of the plurality of nodes.

3. The method of claim 2, wherein said intelligent engines perform cross-layer enhancement within respective ones of said one or more of the plurality of nodes, according to a set of node objectives associated with each of the plurality of nodes.

4. The method of claim 1, wherein said network conditions include one or more of network traffic conditions, network load conditions, network connectivity conditions, network interference conditions, and network capacity conditions.

5. The method of claim 1, wherein said network events include one or more of network attacks, mission defining events, and node failure/addition events.

6. The method of claim 1, wherein steps (a)-(c) are repeatedly performed over the lifetime of the network, thereby providing dynamic cross-layer cross-node enhancement.

7. The method of claim 1, wherein said determining step comprises:
    i) communicating sensed network conditions and/or events between said plurality of nodes;
    ii) performing a joint optimization of wireless communication network protocol layers between said plurality of nodes based on said sensed network conditions and/or events, using said set of network objectives.

8. The method of claim 7, wherein said joint optimization of wireless communication network protocol layers is distributedly performed by said plurality of nodes of the network.

9. The method of claim 7, wherein said joint optimization of wireless communication network protocol layers is centrally performed at a central node of the network.

10. The method of claim 1, wherein said set of network objectives includes one or more of security objectives, performance objectives, and mission constraints.

11. The method of claim 1, wherein said determining step comprises determining an enhanced split of network model layers between said plurality of nodes.

12. The method of claim 1, wherein said distributing step includes performing over-the-air software download of wireless communication network protocol layers, according to the enhanced distribution of wireless communication network protocol layers, to said plurality of nodes.

13. The method of claim 12, wherein said plurality of nodes include configurable platform devices.

14. The method of claim 13, wherein said plurality of nodes include software defined radio platforms.

15. The method of claim 13, wherein said plurality of nodes include field programmable gated array platforms.

16. The method of claim 13, wherein said plurality of nodes include tiled processors.

17. The method of claim 1, wherein said distributing step comprises shifting network model layers between an access controller and access points in a Wireless Local Area Network.

18. The method of claim 1, wherein said distributing step comprises distributing a Multiple Input Multiple Output layer to an optimal number of nodes to jointly form a virtual Multiple Input Multiple Output system.

19. The method of claim 1, wherein said distributing step comprises shifting wireless communication network protocol layers between a base station and mobile stations in a cellular network.

20. The method of claim 1, wherein said distributing step comprises shifting wireless communication network protocol layers between routers and joint tactical radio system devices in a tactical network.

21. A wireless network, comprising:
a plurality of nodes, having one or more processors;
one or more intelligent engines located respectively at one or more of the plurality of nodes, wherein the one or more intelligent engines sense network conditions and/or events;
a first module operable to determine, using a set of network objectives, an enhanced distribution of wireless communication network protocol layers among the plurality of nodes based on the sensed network conditions and/or events; and
a second module operable to distribute wireless communication network protocol layers among the plurality of nodes according to the determined enhanced distribution of wireless communication network protocol layers;
wherein the second module comprises a third module operable to assign a respective function to a node of the plurality of nodes, the respective function defining for the node one or more respective wireless communication network tasks for performance by the node.

22. The network of claim 21, wherein the intelligent engines perform cross-layer enhancement within their respective one or more of the plurality of nodes, according to a set of objectives associated with each of the plurality of nodes.

23. The network of claim 21, wherein said network conditions include one or more of network traffic conditions, network load conditions, network connectivity conditions, and network capacity conditions.

24. The network of claim 21, wherein said network events include one or more of network attacks, mission defining events, and node failure/addition events.

25. The network of claim 21, wherein said first module comprises:
a fourth module operable to communicate sensed network conditions and/or events between said plurality of nodes; and
a fifth module operable to perform a joint optimization of wireless communication network protocol layers among said plurality of nodes based on said network conditions and/or events, using said set of network objectives.

26. The network of claim 25, wherein said fifth module is distributedly located at said plurality of nodes.

27. The network of claim 21, wherein said fifth module includes a central node of the network.

28. The wireless network of claim 21, wherein said set of network objectives include one or more of security objectives, performance objectives, and mission constraints.

29. The wireless network of claim 21, wherein said first module comprises a fourth module operable to determine an enhanced split of network model layers among said plurality of nodes.

30. The wireless network of claim 21, wherein said second module comprises a fourth module operable to perform over-the-air software download of wireless communication network protocol layers, according to the enhanced distribution of wireless communication network protocol layers, at said plurality of nodes.

31. A computer program product comprising a computer useable hardware medium including control logic stored therein, the control logic when executed by one or more processors enabling cross-layer cross-node enhancement of a network having a plurality of nodes according to a method, the method comprising:
determining, using a set of network objectives, an enhanced distribution of wireless communication network protocol layers among the plurality of nodes based on network conditions and/or events sensed by said plurality of nodes; and
distributing wireless communication network protocol layers among the plurality of nodes according to the determined enhanced distribution of wireless communication network protocol layers;
wherein distributing wireless communication network protocol layers comprises assigning a respective function to a node of the plurality of nodes, the respective function defining for the node one or more respective wireless communication network tasks for performance by the node.

32. The computer program product of claim 31, wherein said network conditions include one or more of network traffic conditions, network load conditions, network connectivity conditions, and network capacity conditions.

33. The computer program product of claim 31, wherein said network events include one or more of network attacks, mission defining events, and node failure/addition events.

34. The computer program product of claim 31, wherein said determining an enhanced distribution of wireless communication network protocol layers comprises:
receiving sensed network conditions and/or events from said plurality of nodes; and
performing a joint optimization of wireless communication network protocol layers among said plurality of nodes based on said network conditions and/or events, using said set of network objectives.

35. The computer program product of claim 31, wherein said set of network objectives include one or more of security objectives, performance objectives, and mission constraints.

36. The computer program product of claim 31, wherein said determining an enhanced distribution of wireless communication network protocol layers comprises determining an enhanced split of network model layers among said plurality of nodes.

37. The computer program product of claim 31, wherein said distributing wireless communication network protocol layers among the plurality of nodes comprises performing over-the-air software download of wireless communication network protocol layers, according to the enhanced distribution of wireless communication network protocol layers, to said plurality of nodes.

* * * * *